United States Patent
Carmichael et al.

(10) Patent No.: US 7,660,988 B2
(45) Date of Patent: Feb. 9, 2010

(54) ELECTRONIC NOTARY (75) Inventors: Pat Carmichael, Allen, TX (US); J. Charles Davis, Dallas, TX (US); Scottie Ashley, Dallas, TX (US); Craig Laird, Irving, TX (US)

(73) Assignee: Cognomina, Inc., Irving, TX (US)

( * ) Notice: Subject to any disclaimer, the term of this patent is extended or adjusted under 35 U.S.C. 154(b) by 207 days.

(21) Appl. No.: 10/100,523

(22) Filed: Mar. 18, 2002

(65) Prior Publication Data

US 2003/0177360 A1    Sep. 18, 2003

(51) Int. Cl.
H04L 9/32     (2006.01)
H04L 29/06    (2006.01)
G06F 21/00    (2006.01)
G11C 7/00     (2006.01)
H04K 1/00     (2006.01)
H04L 9/08     (2006.01)
G06Q 20/00    (2006.01)

(52) U.S. Cl. ............ 713/170; 713/155; 713/161; 713/168; 713/179; 713/185; 726/1; 726/5; 726/16; 726/19; 380/255; 380/282; 705/67; 705/76

(58) Field of Classification Search ............ 713/170
See application file for complete search history.

(56) References Cited

U.S. PATENT DOCUMENTS

| | | | | |
|---|---|---|---|---|
| 5,490,217 A * | 2/1996 | Wang et al. | ............ | 380/51 |
| 5,822,432 A * | 10/1998 | Moskowitz et al. | ............ | 380/28 |
| 5,848,426 A * | 12/1998 | Wang et al. | ............ | 715/505 |
| 5,974,150 A * | 10/1999 | Kaish et al. | ............ | 713/179 |
| 6,170,058 B1 * | 1/2001 | Kausik | ............ | 713/193 |
| 6,314,517 B1 * | 11/2001 | Moses et al. | ............ | 713/156 |
| 6,553,494 B1 * | 4/2003 | Glass | ............ | 713/186 |
| 6,587,945 B1 * | 7/2003 | Pasieka | ............ | 713/176 |
| 6,647,328 B2 * | 11/2003 | Walker | ............ | 701/36 |
| 6,671,805 B1 * | 12/2003 | Brown et al. | ............ | 713/176 |
| 6,757,826 B1 * | 6/2004 | Paltenghe | ............ | 713/170 |
| 6,796,489 B2 * | 9/2004 | Slater et al. | ............ | 235/379 |
| 6,865,678 B2 * | 3/2005 | Fischer | ............ | 713/176 |
| 6,904,416 B2 * | 6/2005 | Nassiri | ............ | 705/51 |
| 7,194,618 B1 * | 3/2007 | Suominen | ............ | 713/155 |
| 7,272,720 B2 * | 9/2007 | Hasebe et al. | ............ | 713/178 |
| 7,379,881 B2 * | 5/2008 | Smithies et al. | ............ | 705/1 |
| 2001/0032314 A1 | 10/2001 | Ansper et al. | | |
| 2002/0004800 A1 | 1/2002 | Kikuta et al. | | |
| 2002/0038231 A1 * | 3/2002 | Hasebe et al. | ............ | 705/8 |
| 2002/0038290 A1 * | 3/2002 | Cochran et al. | ............ | 705/50 |
| 2002/0042879 A1 * | 4/2002 | Gould et al. | ............ | 713/176 |

(Continued)

*Primary Examiner*—William R Korzuch
*Assistant Examiner*—Aravind K Moorthy
(74) *Attorney, Agent, or Firm*—Howison & Arnott, L.L.P.

(57) ABSTRACT

A process is disclosed for notarizing a document, by a client in the presence of a notary, comprising the steps of registering the notary, the client and the document, from a local workstation coupled to a central office, to provide for assigning at least one respective encryption key for identifying each of the notary, the client and the document to be notarized; associating in the central office, the respective encryption keys of the client with the notary and with the; generating a transaction code, based on the step of associating the respective encryption keys, for authorizing execution of the to provide the notarizing; executing the; and embedding selected ones of the respective encryption keys together with a notary seal in the document.

17 Claims, 6 Drawing Sheets

U.S. PATENT DOCUMENTS

| | | |
|---|---|---|
| 2002/0053021 A1 | 5/2002 | Rice et al. |
| 2002/0129255 A1* | 9/2002 | Tsuchiyama et al. ........ 713/176 |
| 2002/0138735 A1* | 9/2002 | Felt et al. .................... 713/176 |
| 2002/0143711 A1* | 10/2002 | Nassiri ........................ 705/76 |
| 2002/0161721 A1* | 10/2002 | Yuan et al. .................... 705/65 |
| 2004/0139327 A1* | 7/2004 | Brown et al. ................. 713/176 |
| 2005/0081033 A1* | 4/2005 | Viot et al. .................... 713/170 |
| 2005/0138382 A1* | 6/2005 | Hougaard et al. ........... 713/176 |
| 2007/0118732 A1* | 5/2007 | Whitmore ................... 713/155 |

* cited by examiner

ELECTRONIC NOTARY

TECHNICAL FIELD OF THE INVENTION

The present disclosure pertains generally to executing document signatures electronically during transactions and, more particularly, to notarizing document signing using internet based services.

BACKGROUND OF THE INVENTION

Parties executing documents as part of a transaction between them must do so in the physical presence of a notary who verifies the identity of the party who will affix its signature to the document, witness the acts of signing the documents and affix his or her own signature and notary seal to the signed document. This is often an inconvenient process requiring special arrangements to assemble the parties and the documents at a given time and place, sometimes requiring travel etc. This process, besides being inconvenient, is often wasteful of time and resources. Moreover, security of the documents, the signatures and the information exchanged during the verification of identities, etc., may be inadequate when subject to the difficulties of arranging and accommodating time and place requirements. What is needed therefore, in a business world increasingly characterized by transactions performed electronically, is a way to utilize the electronic facilities available to the parties to perform the steps in the notary process enumerated above and to do so while maintaining or improving the security of the transaction of the documents involved.

SUMMARY OF THE INVENTION

A process is disclosed for notarizing at least one document, by a client in the presence of a notary, comprising the steps of registering the notary, the client and the at least one document, from a local workstation coupled to a central office via a global communication network, to provide for assigning at least one respective encryption key for identifying each of the notary, the client and the at least one document to be notarized; associating in a first database in the central office, the respective encryption keys of the client with the notary and with the at least one document; generating a transaction code, based on the step of associating the respective encryption keys, for authorizing execution of the at least one document to provide the notarizing; executing the at least one document; and embedding selected ones of the respective encryption keys together with a notary seal in the at least one document.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
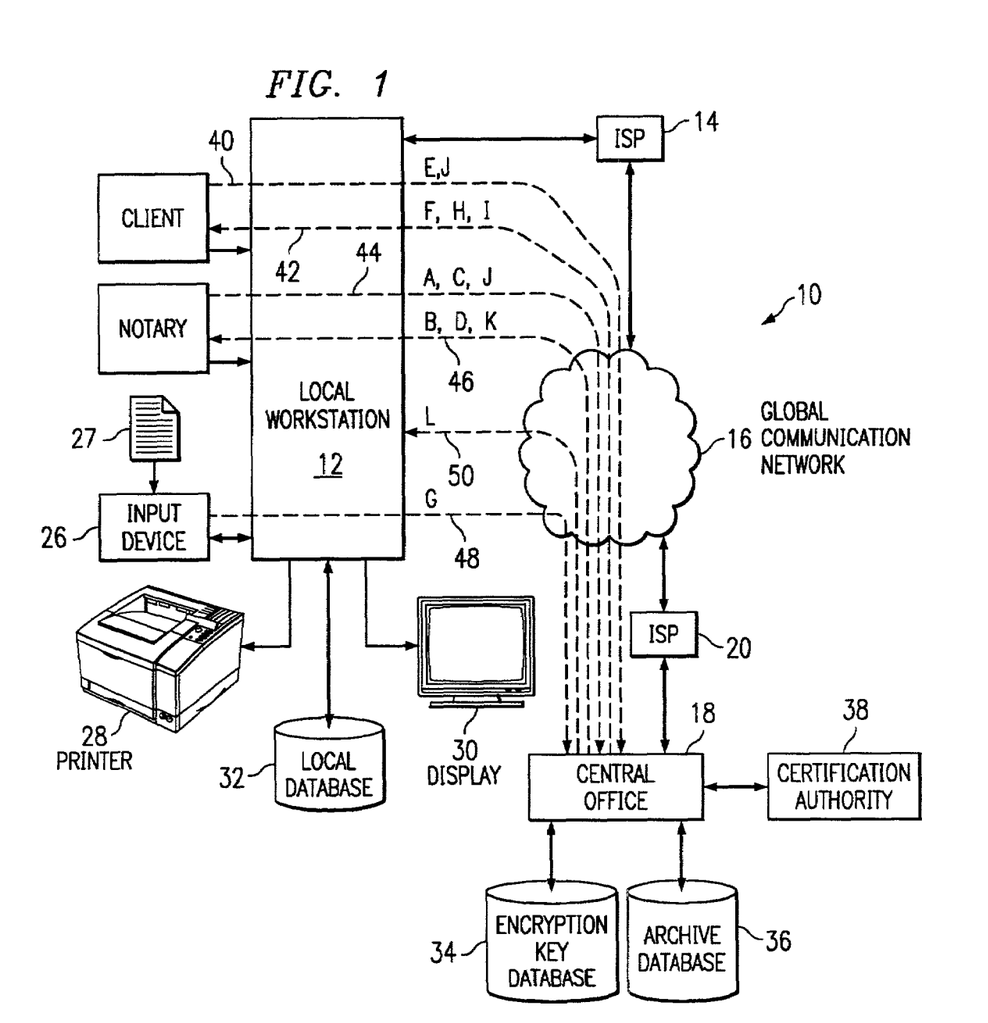
FIG. 1 illustrates an overall block diagram of an electronic notary system according to the present disclosure.

Referring now to FIG. 1, there is illustrated an overall block diagram of an electronic notary system 10 according to the present disclosure. A local workstation 12 is coupled through an internet service provider 14 to a global communication network (CCN) 16 which may also be known as the Internet 16. Similarly a Cognomina central office 18 is coupled through an internet service provider 20 to the global communication network 16. Feeding into the local workstation 12 are inputs from a client 22, from a notary 24 and a from a block representing input devices 26 for entering a document 27, which input device 26 includes, for example, a scanner, keyboard, a disc drive for retrieving a file from memory media or other memory device, etc. Local workstation 12, sometimes also called workstation 12, may also be coupled to a printer 28, to a display 30 and to a local database 32. The Cognomina central office 18 is also coupled with an encryption key database 34 and an archive database 36.

As will become clear in the description which follows, the Cognomina central office 18 plays a central role in the control of the notarizing process as well as the issuance of encryption keys associated with the client 22, the notary 24 and the document 27 entered through the input device 26 during the electronic notary process. The encryption key database 34 provides a storage facility for the various encryption keys which are issued according to a public key-private key or asymmetric encryption system. The encryption keys are issued to protect the identities of the parties or documents as contrasted with a frequent use of such encryption to encrypt the text of a document. The archive database 36 provides for storage of the document 27 following the completion of the electronic notary process disclosed herein. Associated with the Cognomina central office 18 is its relationship with a certification authority 38 which provides for registering the electronic notary system provider of the present disclosure as well as a directory of the public keys assigned during the transactions processed using the electronic notary system of the present disclosure.

In operation, an electronic notary program installed at the local workstation 12 controls the operation of the notarization process including the registration of the notary 24, the client 22 and the document 27 as well as the communication via the GCN 16. Similarly, the central office 18 operates according to a programmed process to interact with the local workstation 12, the databases 34, 36 coupled to the central office 18 as well as the communication via the GCN 16.

Referring further to FIG. 1, it will be observed that the parties interacting with the local workstation 12 and the Cognomina central office 18 via the global communication network 16 are further interconnected by dashed lines representing the communication of information or documents between the entities shown. These dashed lines are identified by bold face capital letters which correspond with steps in the process to be described hereinbelow in conjunction with FIGS. 2 and 3. For example lines 40 and 42, also identified with the letters E, F, J, H and I, couple the client 22 with the Cognomina central office 18 through the local workstation 12 and the global communication network 16. Similarly, lines 44 and 46, also identified with the letters A, B, C, D, J and K, couple the interaction of the notary 24 through the local workstation 12 and via the global communication network 16 to the Cognomina central office 18. Likewise, the input devices are coupled through dashed line 48, also identified with the letter G, to the Cognomina central office 18 via the global communication network 16 and dashed line 50, also identified with the letter L, which couples the Cognomina central office 18 through the global communication network 16 back to the local workstation 12. The capital letters assigned to the dashed lines identify certain steps, described in FIGS. 2 and 3, of the electronic notary process in the sequence in which they occur illustrated in FIG. 1.

Figure 2:
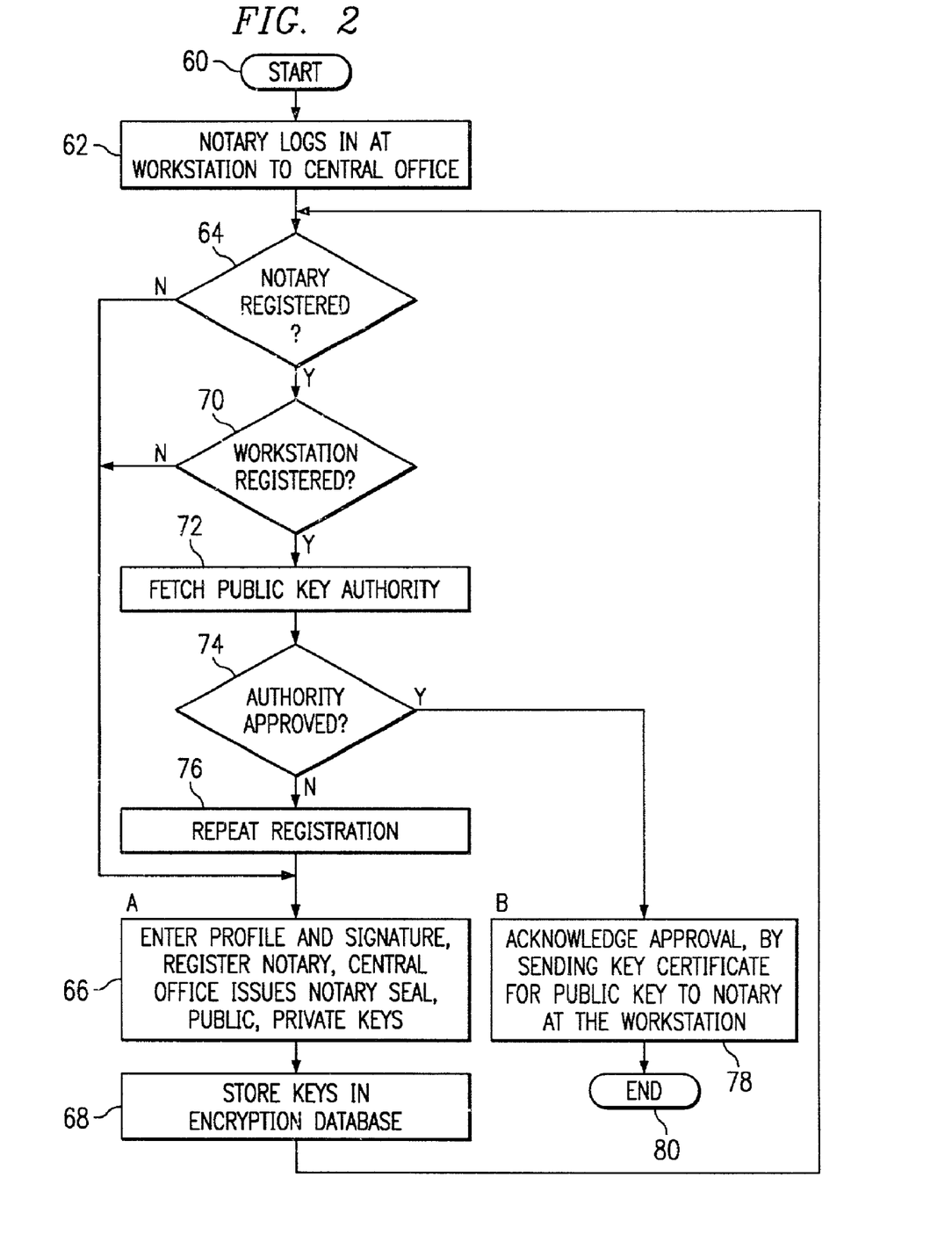
FIG. 2 illustrates a simplified flowchart for registering a notary in the embodiment of the electronic notary system of FIG. 1.

Referring now to FIG. 2, there is illustrated a simplified flowchart for registering a notary in the electronic notary system of the embodiment of FIG. 1. The process beings at a Start block 60 and proceeds to block 62 where the notary 24 logs in to the central office 18 at the local workstation 12. Following login the process inquires whether the notary 24 is registered with the central office 18 in decision block 64. If the result is negative then the process proceeds to block 66 where the notary 24 enters his or her profile information and a signature graphic to become registered in the central office 18. If the registration is completed successfully, the central office 18 issues a notary seal and the public and private keys associated with the notary 24. The process proceeds to block 68 where the central office 18 stores the public and private keys in the encryption key database 34 coupled with the central office 18 and the flow returns to the input of decision block 64 to again inquire whether the notary 24 is registered. If the answer is affirmative, then the flow proceeds to decision block 70 wherein the central office 18 checks whether the local workstation 12 is registered in the central office 18. If the response is negative, then the flow returns to the input to block 66 to perform the registration process for the local workstation 12 using similar steps to the registration of a notary, the difference being that the local workstation 12 does not supply a signature and it does not receive a notary seal. However it does supply information that identifies the workstation 12. Once the workstation 12 is properly registered, then the flow proceeds from decision block 70 along the path labeled Y to block 72 wherein the workstation 12 fetches a public key authority from the central office 18; if the authority is approved in decision block 74, the flow proceeds to block 78 whereupon the central office 18 acknowledges its approval for the use of the public key by sending a key certificate for the public key to the notary 24 at the local workstation 12. If, however, in decision block 74, the authority was not approved, then the flow proceeds along the N path to block 76 to repeat the registration process. Once the approval of the public key authority is given by sending the key certificate in block 78, the flow proceeds to block 80 where it ends the process of registering a notary.

Figure 3A:
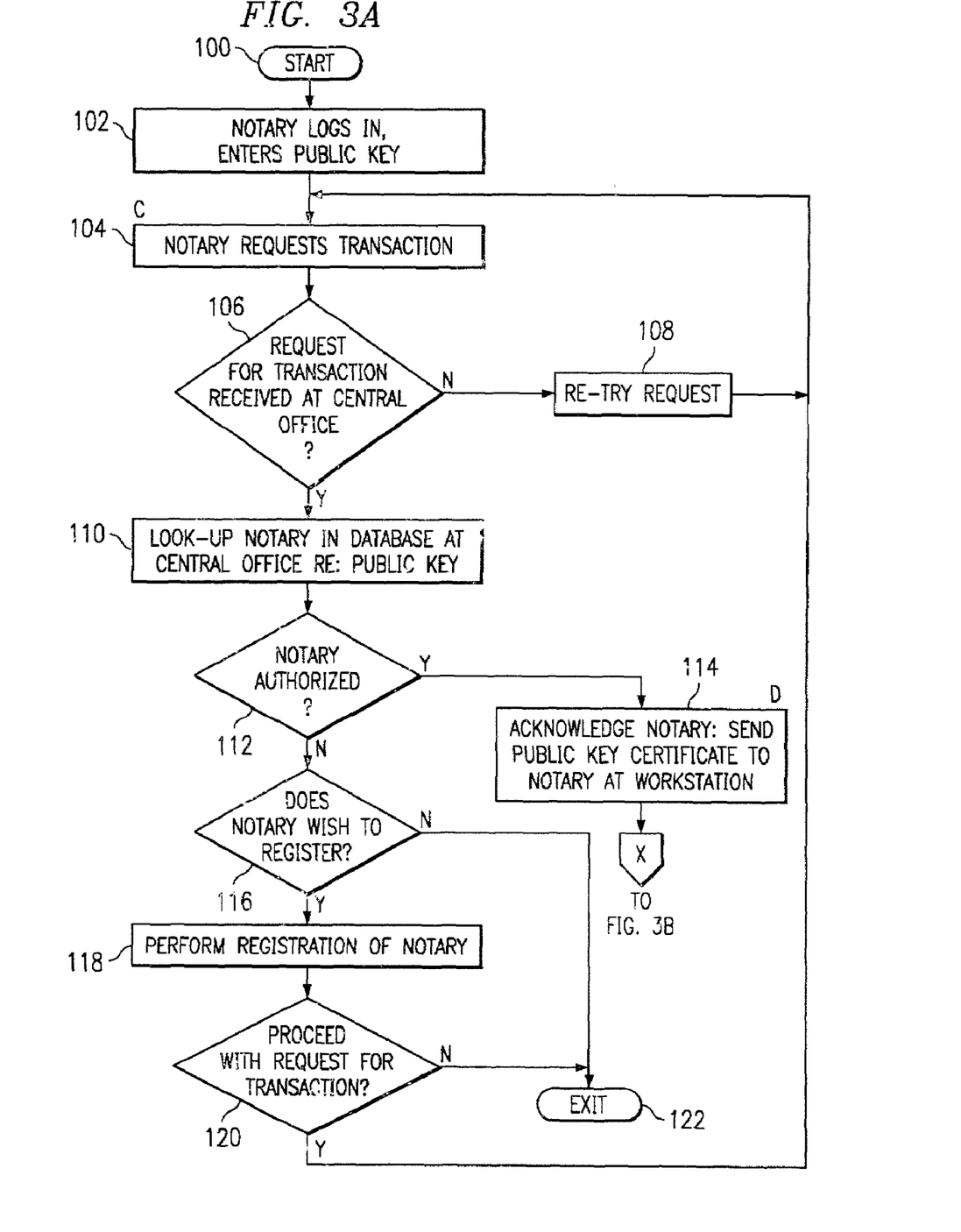
FIG. 3A illustrates a first portion of a simplified flowchart for electronically notarizing a document in the electronic notary system of FIG. 1.

Referring now to FIG. 3A, there is illustrated a first portion of a simplified flowchart for electronically notarizing a document in the electronic notary system of FIG. 1. The process begins at a Start block 100 and proceeds to block 102. Therein the notary 24 operating at the local workstation 12 logs in and enters his or her public key that was previously assigned during the registration of the notary 24 as described hereinabove. The flow of the process after the notary 24 logs in at block 102 proceeds to block 104 where the notary enters a request to perform a notary transaction. The next step, decision block 106, determines whether the request to perform a notary transaction has been received at the central office 18. If the result is negative, then the flow follows the N path to block 108 to retry the request to perform a notary transaction and the flow returns to the input to block 104. If the result of the determination in block 106 is affirmative, then the flow proceeds along the Y path to block 110 wherein the central office 18 looks up the notary public key record in the encryption key database 34 at the central office 18. If the notary 24 is authorized in decision block 112, the flow proceeds along the Y path to block 114 to acknowledge the notary 24 by sending a public key certification to the notary 24 at the local workstation 12. If, in decision block 112 the notary 24 was not authorized, then the flow proceeds along the path labeled N to another decision block 116 in which the central office 18 inquires of the notary 24 at local workstation 12 whether the notary 24 wishes to re-register with the central office 18. If the notary 24 enters a negative response, then the flow proceeds along an exit path at block 122. If, however the notary 24 enters an affirmative response in decision block 116, the flow proceeds to block 118 to perform the registration of the notary 24 in the procedure described hereinabove with respect to FIG. 2. Then, the flow proceeds to another decision block 120, wherein the notary 24 is asked whether he or she wishes to proceed with a request to perform a notary transaction. If the notary 24 responds in the negative, the flow follows the N path to the exit block 122. If the notary 24 responds affirmatively, then the flow follows the Y path back to the input to block 104 wherein the notary 24 is again provided the opportunity to request a transaction. After the notary 24 has received the public key certification at the workstation in block 114, the flow proceeds along the path identified with the letter X to FIG. 3B.

Figure 3B:
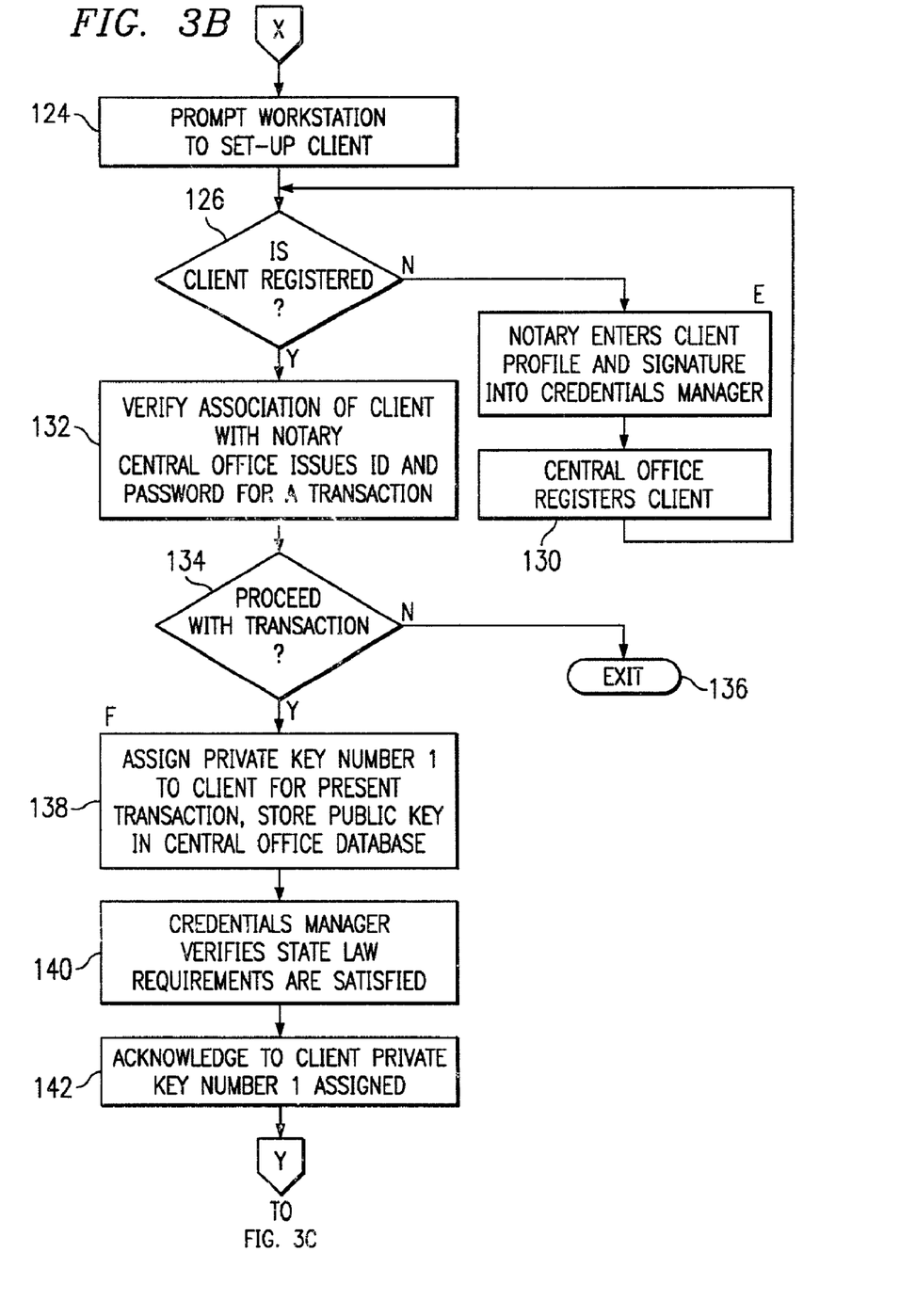
FIG. 3B illustrates a second portion of the simplified flowchart for electronically notarizing a document in the electronic notary system of FIG. 1.

Referring now to FIG. 3B, there is illustrated a second portion of the flow chart begun in FIG. 3A. The process flow from block 114 in FIG. 3A, identified with the letter X, enters block 124 to prompt the workstation 12 to set up the client who wishes to notarize one or more document 27. Following the prompt to the workstation 12 to set up a client 22 at block 124, the flow proceeds to a decision block 126 wherein the system inquires whether the client 22 is registered. If the response is negative, the flow follows the N path to block 128 whereupon the notary 24 enters the client 22 profile and signature graphic in to a credentials manager portion (not shown) of the program operating on the local workstation 12. The client profile and signature information is then utilized in block 130 by the central office 18 to register the client 22 into the system and flow again enters decision block 126 to determine whether or not the client 22 is in fact registered. If the response is affirmative, the flow proceeds along the Y path to block 132 whereupon the central office 18 verifies the association of the client 22 with the notary 24 and issues an ID and password for the notary transaction requested previously. In the next step at decision block 134, the central office 18 inquires whether the client 22 wishes to proceed with the transaction; if the response is negative the flow proceeds along the N path to the exit block at 136. If, however, the result of the determination in decision block 134 is affirmative, the flow proceeds to block 138 whereupon the central office 18 assigns a first private key to the client 22 for the present transaction and stores the public key portion of the first public key-private key pair assigned to the client in the encryption key database 34. In the next step, at block 140, the credential manager then reviews the profile information for the notary 24 and the client 22 and the request for the transaction to verify whether state law requirements for notarizing documents are being satisfied. Upon a successful review of this information, the central office 18 in step 142 acknowledges to the client 22 that the private key portion of the first public key-private key pair has been properly assigned to it and the flow follows the Y path to the next step in FIG. 3C.

Figure 3C:
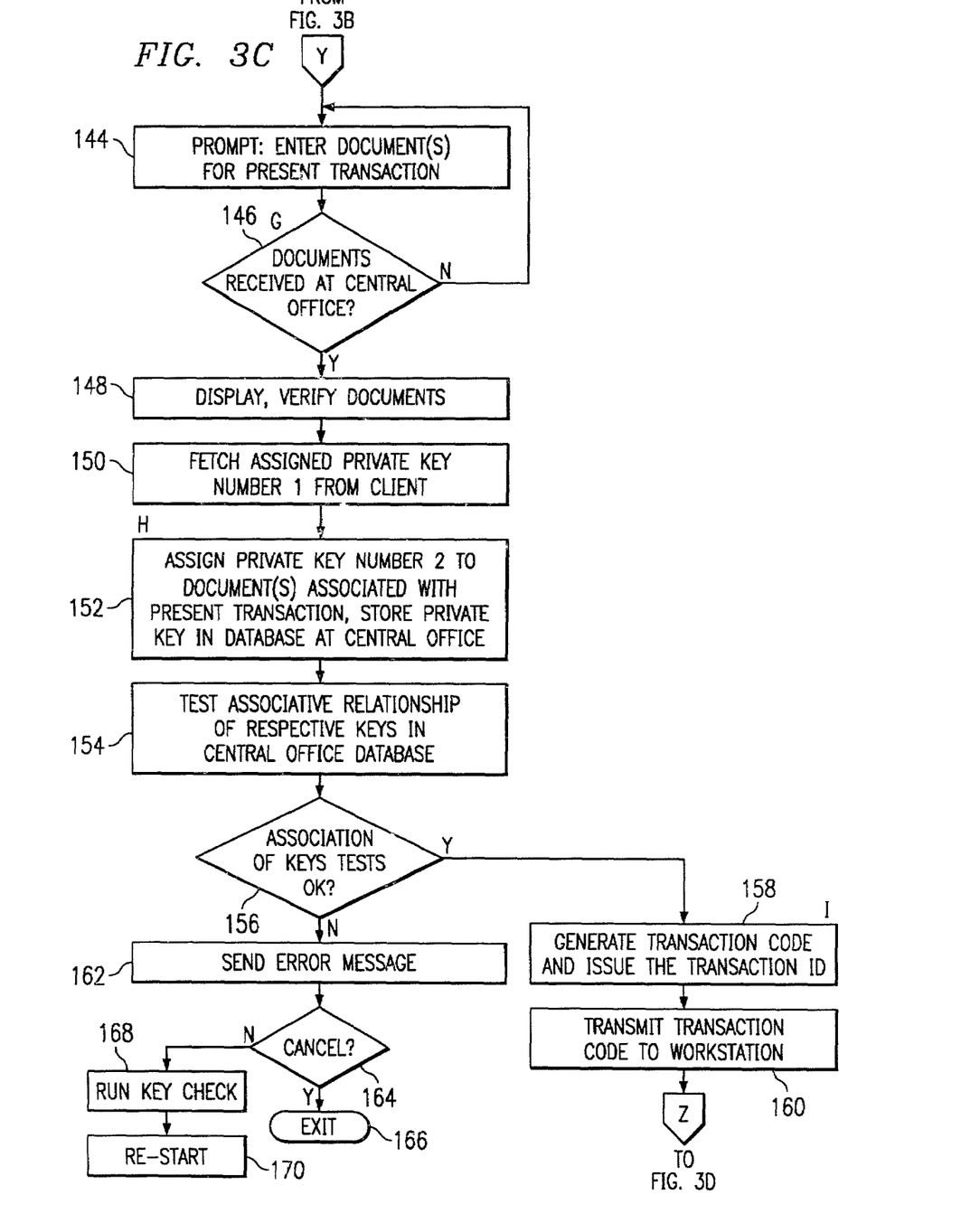
FIG. 3C illustrates a third portion of the simplified flowchart for electronically notarizing a document in the electronic notary system of FIG. 1.

Referring now to FIG. 3C, there is illustrated a third portion of the flow chart of FIGS. 3A and 3B. The process enters the FIG. 3C at the path labeled Y to block 144 whereupon a prompt is issued to a client 22 to enter the document 27 for which a notary transaction has been requested. Following the prompt, the flow proceeds to a decision block 146 to determine whether the document 27 entered by the client 22 at the local workstation 12 has been received at the central office 18. If the result is negative, the flow returns to the beginning of block 144 to again request the entry of the document 27. If however, in block 146, it is determined that the document 27 has been received at the central office 18, then the flow proceeds to block 148 to display the document 27 upon the display 30 at the local workstation 12 so that the client 22 and the notary 24 may verify the document 27 that has been entered previously. When the document 27 has been verified on the display 30 at the local workstation 12, the flow proceeds to block 150 whereupon the system fetches the assigned first private key from the client 22 and proceeds to step 152 whereupon the central office 18 assigns the private key portion of a second private key-public key pair to the document 27 associated with the present transaction and stores the second private key in the encryption key database 34 at the central office 18.

In the next step at block 154 in FIG. 3C, the central office 18 tests the associative relationship of the respective public and private key pairs that have been assigned to the notary 24, the client 22 and the document 27. In particular, the associative relationship of the client 22 with the notary 24, and of the client 22 with the document 27 entered by the client 22 at the local workstation 12 are tested. If the association of the respective encryption keys in the encryption key database 34 of the central office 18 tests OK in decision block 156, then the flow proceeds to block 158 to generate a transaction code corresponding to the successful test of the associative relationship and issue a transaction ID representing the present transaction involving the notary 24, the client 22 and the document 27, and transmits it together with the transaction code to the local workstation 12 in block 160. If however, in decision block 156, the test for an associative relationship of the respective encryption keys was not successful, then the flow proceeds along the N path to block 162 whereupon the central office 18 transmits an error message to the local workstation 12 from which in the following step, decision block 164, the local workstation 12 requests of the notary 24 whether he or she wishes to cancel the transaction. If the notary responds affirmatively, then the flow exits along a Y path to the exit block 166. If, however, the notary 24 responds negatively, then the flow proceeds from decision block 164 to block 168 where the central office 18 may perform an encryption key check to determine the reason for the unsuccessful test of the associative relationship of the respective encryption keys. Such a key check routine may include steps to correct an error or perform a new registration as determined by a trouble shooting portion of the key check routine in block 168. Following the key check routine in block 168, the flow then proceeds to block 170 to restart the transaction in which case the flow would exit the transaction routine and return to the Start block 100 shown in FIG. 3A. Returning to block 160 and the transmission of the transaction code along with the transaction ID to the local workstation 12 the flow thereupon proceeds along the path labeled with a letter Z to the entry point of FIG. 3D.

Figure 3D:
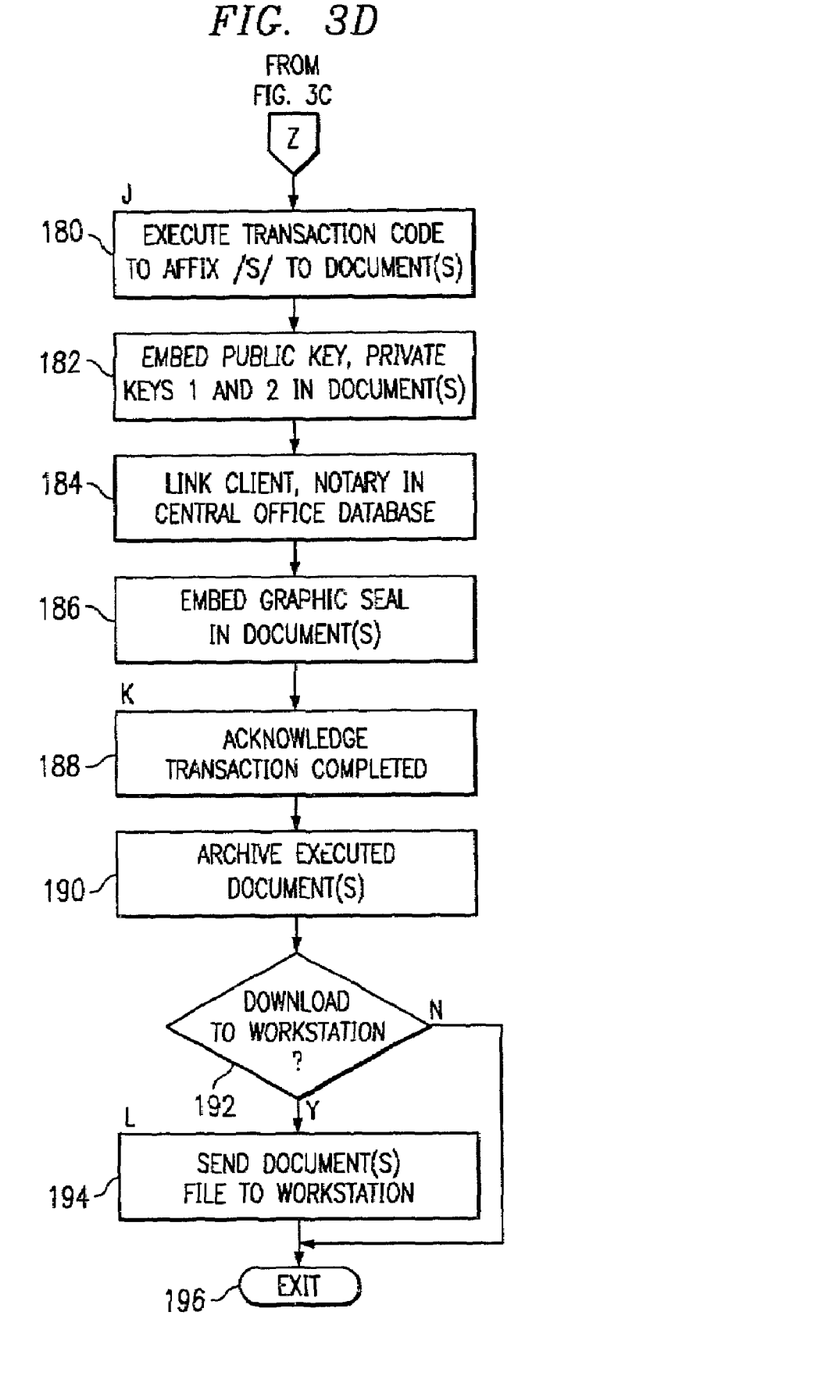
FIG. 3D illustrates a fourth portion of a simplified flowchart for electronically notarizing a document in the electronic notary system of FIG. 1.

Referring now to FIG. 3D, there is illustrated a fourth portion of the flow chart of FIGS. 3A, 3B and 3C. The process follows the Z path from block 160 in FIG. 3C to block 180 in FIG. 3D wherein the local workstation 12 prompts the client 22 to execute the transaction code at the local workstation 12 by entering a command to affix the signature of the client 22 previously entered in a graphic routine to the document 27. In the next step at block 182, the system embeds the first and second public key private key pairs into the document 27 and then, in step 184, confirms the link of the client 22 and the notary 24 in the central office database. Next, in step 186, the graphic seal and the signature of the notary 24 is embedded in or affixed to the document 27 at the local workstation 12. From block 186, the flow proceeds to block 188 whereupon the central office 18 acknowledges the completion of the notary transaction and in the following step 190 archives the executed documents in the central office archive database 36. In the next step 182, the system inquires of the notary 24 or the client 22 whether to download a copy of the document 27 to the local workstation 12. If the response is negative, the flow follows the N path to exit at block 196. If, however, the client 22 wishes to have a copy of the document 27 that has been notarized, then the client 22 enters an affirmative response to the query in 192 and the workstation 12 queries the central office 18 in block 194 to download a copy of the file containing the executed document 27 to the local workstation 12. The routine exits at block 196.

Although the preferred embodiment has been described in detail, it should be understood that various changes, substitutions and alterations can be made therein without departing from the spirit and scope of the invention as defined by the appended claims.

What is claimed is:

1. A process for notarizing at least one document in accordance with an official notarization process recognized by government agencies, by a client in the physical presence of a notary, which notary possess a fiducial relationship with the government agency, comprising the steps of:

registering the notary, the client and the at least one document, from a local workstation coupled to a central office via a global communication network while the notary and client are both physically present in their respective persons thereat, to provide for assigning at least one respective encryption key to each of the notary, the client and the at least one document to be notarized, wherein the central office as a result of the step of registering will have stored thereat information associated with both the client and the notary representing indicia that is associated with a notarized document as the result of a notarization process being carried out with the client and the notary at the local station;

associating in a first database in the central office, the encryption keys of the client with the encryption keys of the notary and with the encryption keys of the at least one document in response to the notary and the client initiating a notarization process on the local workstation;

generating a transaction code, based on the step of associating the respective encryption keys, for authorizing execution of the at least one document to provide for the notarizing of the at least one document, and transmitting the transaction code from the central office to the local workstation;

executing the at least one document by the client by executing the transaction code to cause the central office to associate with the at least one document at the central office the indicia of both the client and the notary; and embedding with the document at least a selected one of the respective encryption keys in association with the indicia of both the client and the notary already associated with the at least one document, wherein the step of embedding and executing occurs at the local station with the notary and client present during the transaction.

2. The process of claim 1, further comprising the step of: storing the executed document with the embedded encryption keys in an archive database at the central office.

3. The process of claim 1, wherein the step of registering comprises the steps of:
inputting a request for a notarizing transaction at the workstation;
transmitting information representing the notary, the client or the at least one document from the local workstation to the central office;
assigning a respective asymmetric encryption key pair to the notary, the client or the at least one document transmitting the information;
transmitting to the workstation a select one of the respective asymmetric key pair to the notary, the client or the at least one document transmitting the information; and
storing an unselected one of the respective asymmetric key pair for the notary, the client or the at least one document in the first database at the central office.

4. The process of claim 3, wherein the step of transmitting information comprises the steps of:
inputting the information to the local workstation;
processing the information for transmitting via the global communication network; and
cross-checking in the central office the received information representing the notary, the client or the at least one document.

5. The process of claim 3, wherein the information comprises:
identification information about the notary, or the client, or text and image information contained in the at least one document; and
a signature graphic of the signature of the notary or the client.

6. The process of claim 1, wherein the central office comprises:
a workstation having at least first and second databases, the central office being coupled with the global communication network and a certificating authority;
a program for generating an asymmetric encryption key pair for assignment respectively to each of the notary, the client and the at least one document; and
a device for associating, in the first database in the central office, each of the respective asymmetric encryption key pairs of the notary, the client and the document with each other.

7. The process of claim 6, wherein an asymmetric encryption key pair comprises:
a public key and a corresponding private key.

8. The process of claim 1, wherein the step of associating comprises the steps of:
storing the respective encryption keys in linked locations in the first database after assigning the keys to the client and the at least one document such that the respective encryption keys for the client and the notary are linked and the respective encryption keys for the client and the at least one document are linked; and
testing the linked locations for a correct match among the respective encryption keys prior to generating the transaction code for issue to the local workstation.

9. The process of claim 1, wherein the step of generating the transaction code comprises the steps of:
issuing the transaction code to the local workstation corresponding to a correct match among the respective encryption keys for the client and the notary and the respective encryption keys for the client and the at least one document.

10. The process of claim 1, wherein the step of executing comprises the steps of:
entering at the local workstation the transaction;
generating a signature graphic for each of the client and the notary; and
generating a notary seal graphic for the notary and the at least one document.

11. The process of claim 1, wherein the step of executing the transaction code causes the central office to affix with the at least one document at the central office the indicia of both the client and the notary.

12. The process of claim 11, wherein the indicia of the client includes a graphic signature thereof that is stored at the central office.

13. The process of claim 11, wherein the indicia of the notary includes a graphic notary seal of the notary that is stored at the central office.

14. A process for notarizing at least one document by a client in the physical presence of a notary from a local workstation on a global communication network which is authenticated at a central office on the global communication network to provide an electronic notarized document, the process conducted in accordance with an official notarization process recognized by government agencies, and wherein the notary possesses a fiducial relationship with the government agency, comprising the steps of:
registering the notary at the central office, such that the notary has associated therewith at the central office in a database both an electronic indicia unique to the notary and associated encryption keys;
registering the client at the central office, such that the client has associated therewith at the central office in a database an electronic indicia unique to the client;
initiating a transaction at the local workstation by the notary and the client who are physically present thereat, such that the notarization process is conducted with the notary and client being disposed at the local workstation at the same time and being a requirement thereof;
associating the client with the notary at the central office and issuing a first set of transaction encryption keys assigned to the client for at least the current transaction, and associating the encryption keys for the client and the notary in a first association in the database at the central office;
forwarding to the central office at least one document to be notarized;
assigning a second set of transaction encryption keys for the document associated with the current transaction;
associating in a second association in the database at the central office the encryption keys of the client with the encryption keys of the document;
verifying that the encryption keys of the client for the current transaction are associated with the encryption keys of both the notary and the document and, if so, generating a transaction code at the central office and transmitting it to the workstation for authorizing execution of the at least one document to provide for the notarizing of the at least one document;
executing the at least one document by the client by executing the transaction code at the workstation to cause the central office to associate with the at least one document at the central office the electronic indicia of both the client and the notary, wherein the step of executing occurs when the notary and client are located at the local station exclusive of all other locations; and embedding within the document at least a selected one of the respective encryption keys in association with the electronic indicia of both the client and the notary already associated with the at least one document, the step of executing and embedding occurring while the notary and the client are disposed at the local workstation.

15. A process for notarizing at least one document, by a client in the physical presence of a notary, the process conducted in accordance with an official notarization process recognized by government agencies, and wherein the notary possesses a fiducial relationship with the government agency, comprising the steps of:

registering the notary and the client, from a local workstation coupled to a central office via a global communication network, to provide for assigning at least one respective encryption key to each of the notary and the client, wherein the central office as a result of the step of registering will have stored thereat information associated with both the client and the notary representing indicia that is associated with a notarized document as the result of a notarization process;

initiating a transaction by the notary and the client while the notary and client are physically disposed at a local workstation at the same time in their respective persons;

associating in a first database in the central office through actions by the notary the at least one encryption key of the client with the at least one encryption key of the notary to provide a first association;

forwarding by the client at least one document to be notarized to the central office, wherein the central office assigns at least one encryption key thereto;

associating in the first database the at least one encryption key of the client with the at least one encryption key of the at least one document in a second association;

verifying that the at least one encryption key of the client is associated with both the first and second associations;

generating a transaction code, based on the step of verifying, for authorizing execution of the at least one document to provide for the notarizing of the at least one document, and transmitting the transaction code from the central office to the local workstation;

executing the at least one document by the client by executing the transaction code at the local workstation to cause the central office to associate with the at least one document at the central office the indicia of both the client and the notary; and embedding within the document at least a selected one of the respective encryption keys in association with the indicia of both the client and the notary already associated with the at least one document, the step of executing and embedding occurring while the notary and the client are disposed at the local workstation.

16. The process of claim 15, wherein the indicia associated with the notary is a notary seal and the indicia associated with the client is a signature.

17. The process of claim 15, and further comprising the step of displaying the document to at least the client for approval prior to the step of assigning at least one encryption key to the at least one document.

* * * * *